Jan. 12, 1937.  B. L. GREEN  2,067,186
SELECTING MECHANISM
Original Filed Sept. 9, 1933   7 Sheets-Sheet 1
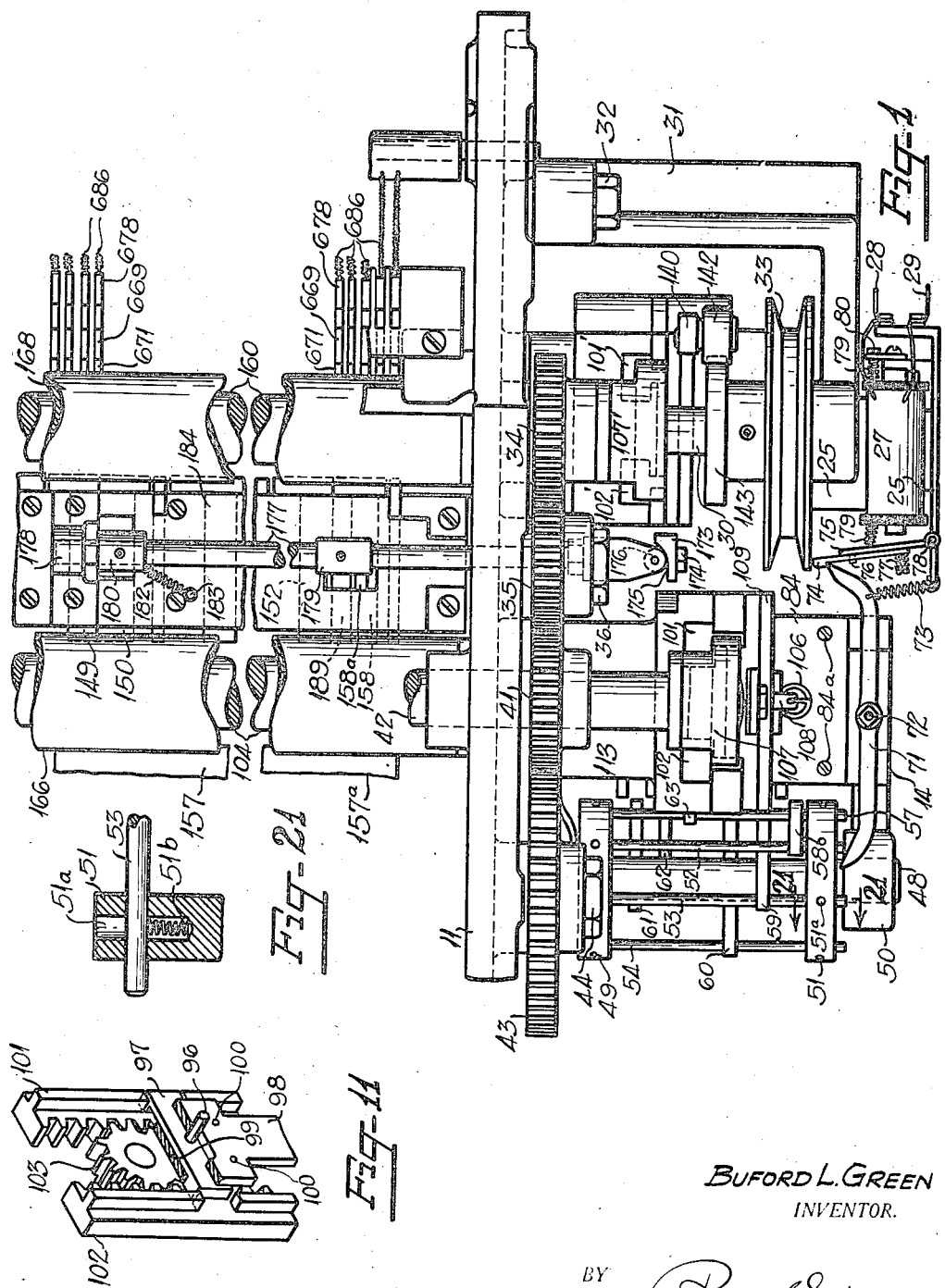
BUFORD L. GREEN
INVENTOR.
BY *Paul S Eaton*
ATTORNEY.

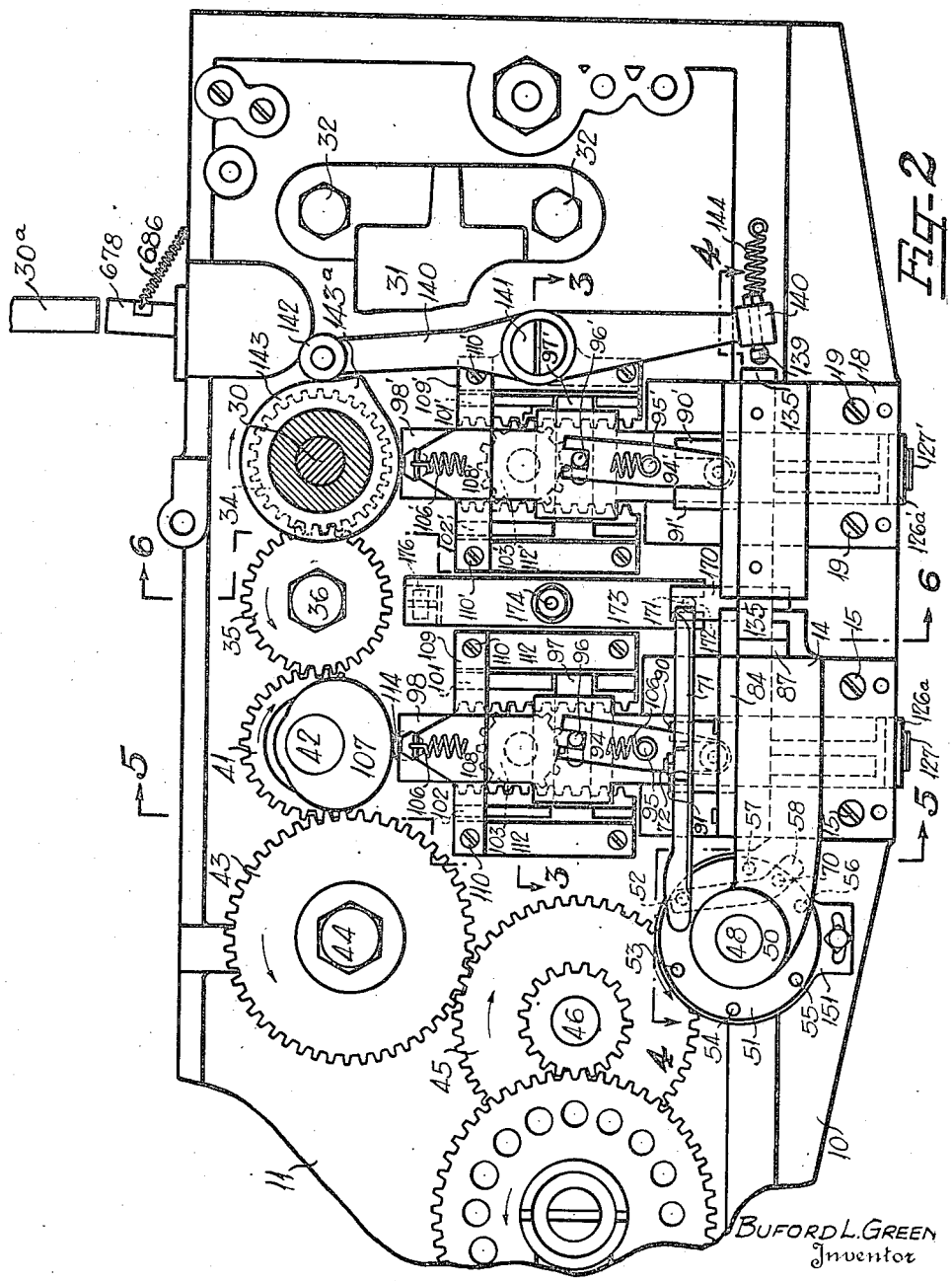

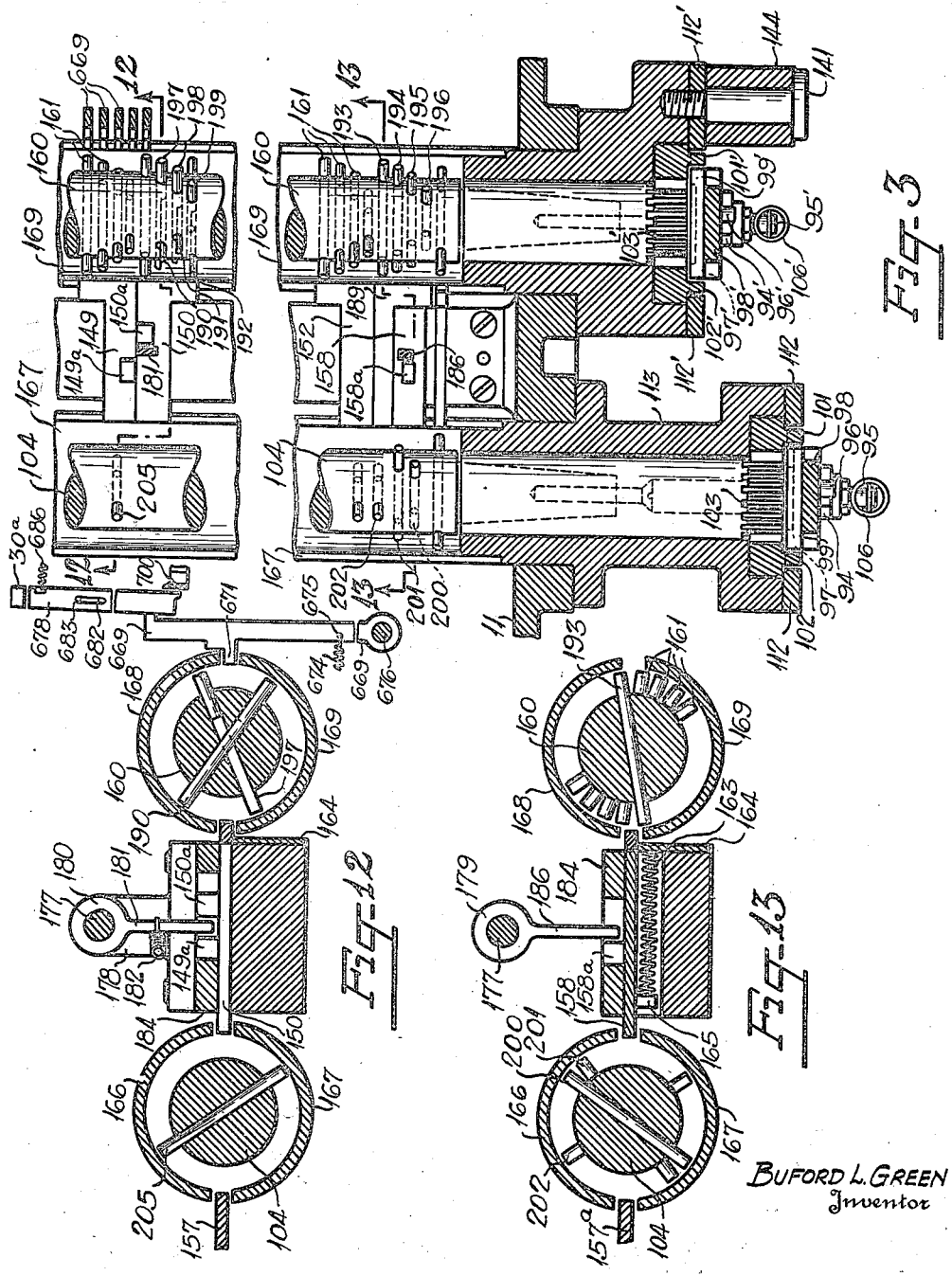

Jan. 12, 1937.   B. L. GREEN   2,067,186
SELECTING MECHANISM
Original Filed Sept. 9, 1933   7 Sheets-Sheet 4

BUFORD L. GREEN
Inventor

By Powell Eaton
Attorney

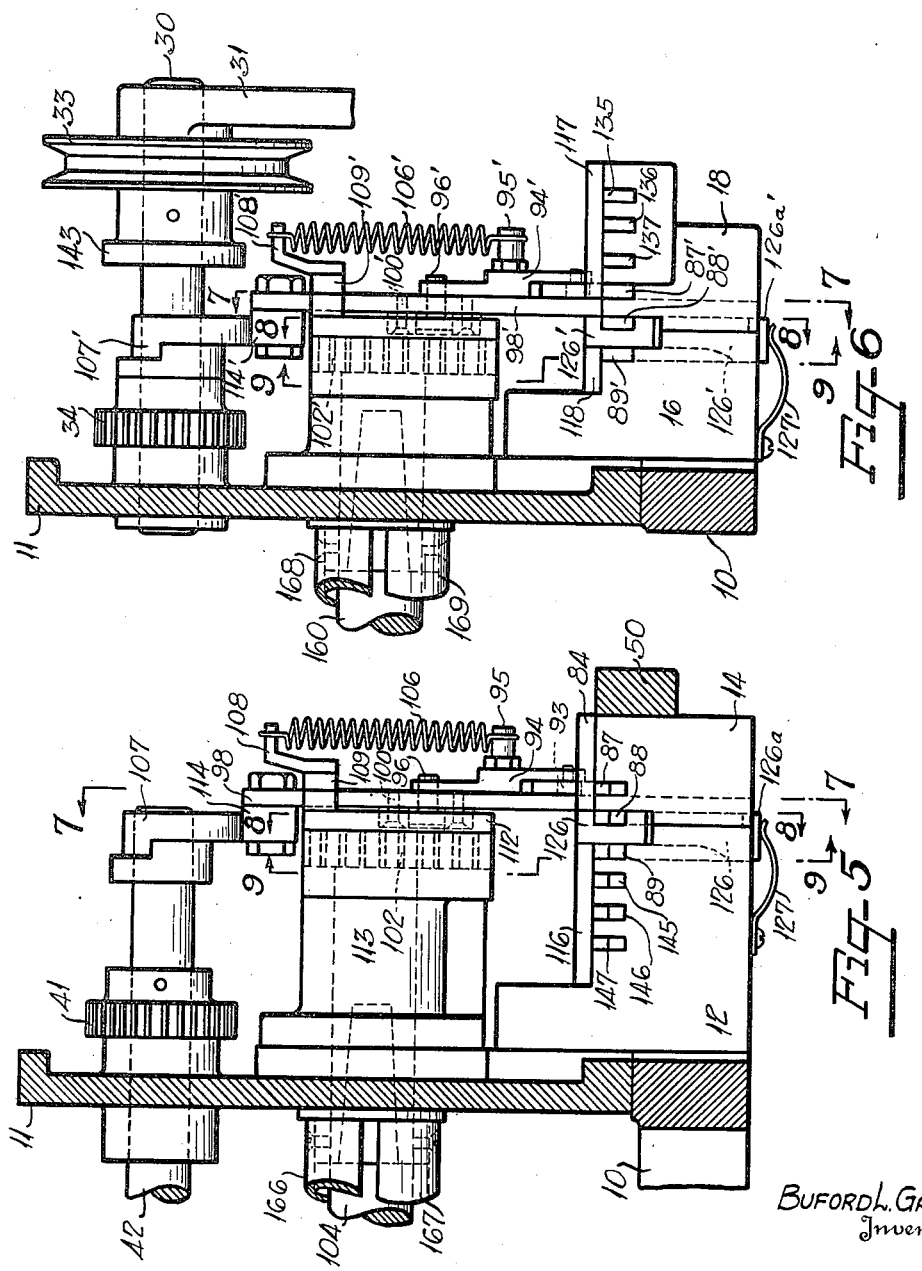

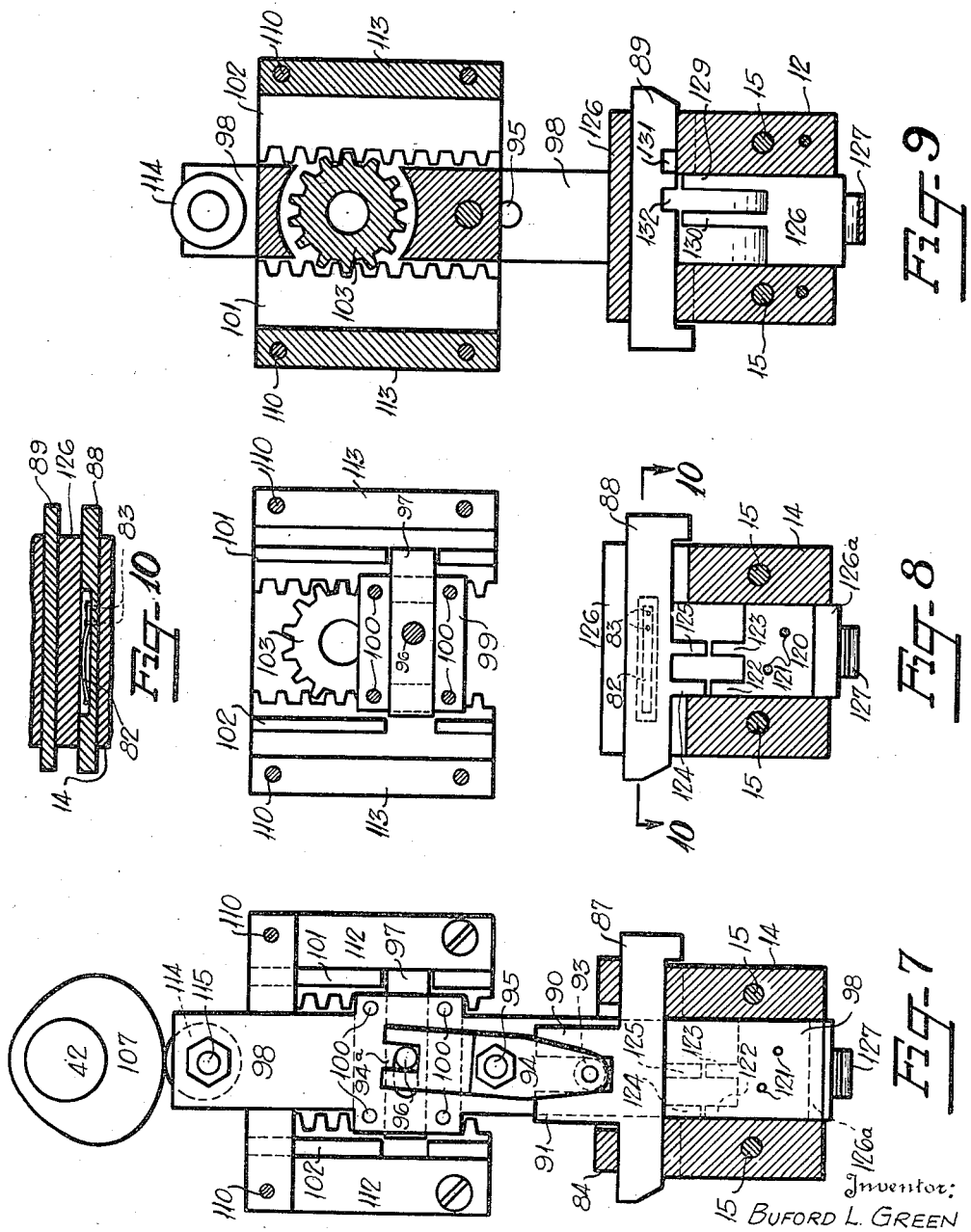

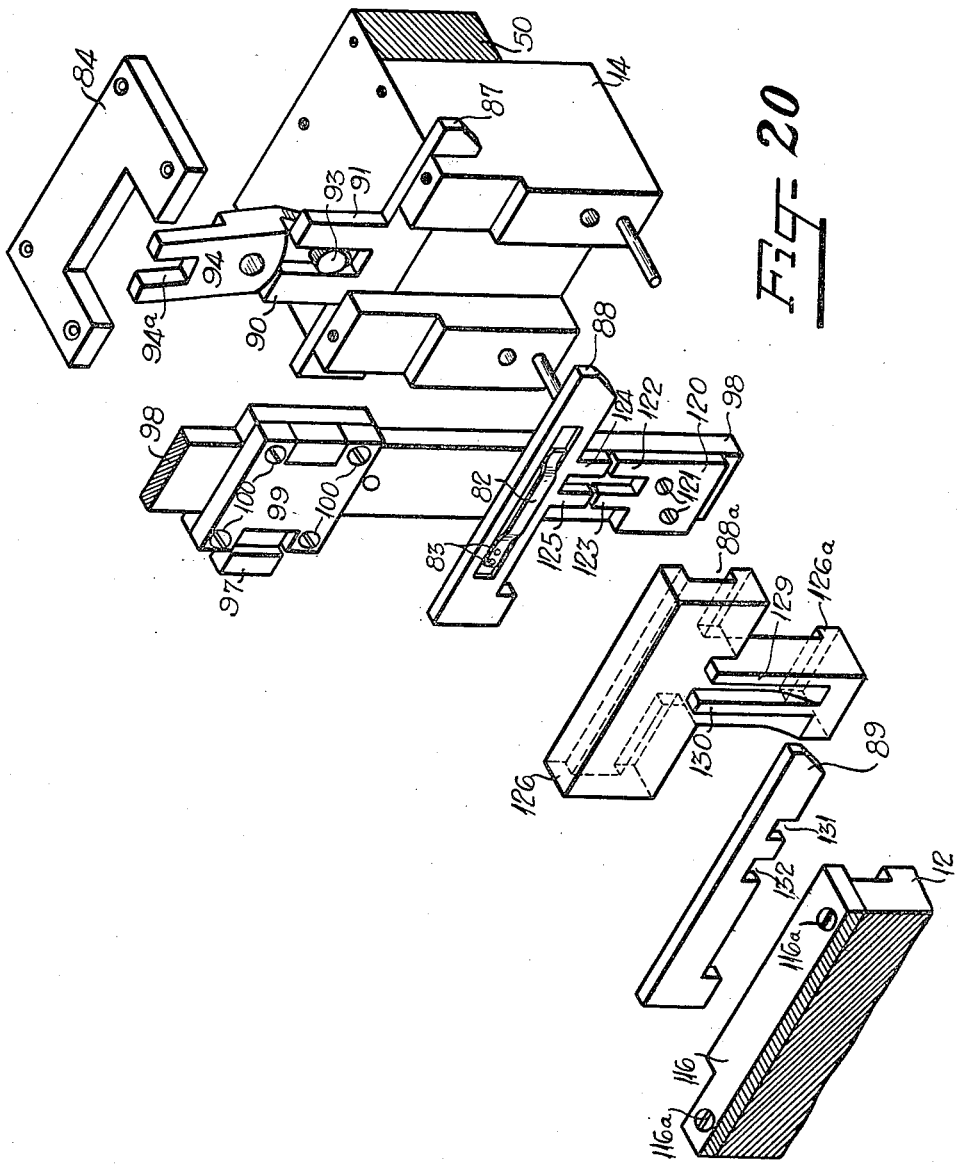

UNITED STATES PATENT OFFICE 2,067,186

SELECTING MECHANISM

Buford L. Green, Charlotte, N. C., assignor to Semagraph Company, Dover, Del., a corporation of Delaware Application September 9, 1933, Serial No. 688,753
Renewed July 29, 1936

78 Claims. (Cl. 199—18)

This invention relates to a selector for selecting characters in type-writing, type-setting machines and the like, and is capable of being used as a selector for controlling a plurality of work performing instrumentalities of any type desired.

The invention broadly contemplates the provision of a constantly rotating first selector having a plurality of slidable rods thereon, the number of slidable rods being equal to the greatest number of impulses for a given character. This rotating selector has the slidable rod moved when the impulse is not transmitted to the magnet controlling the cam lever to release the same. It is evident that the reverse might be true and that the impulse could actuate the sliding rods by reversal of the mechanism. The rotating selector with the sliding rods therein are each provided with a lug which is fixed thereon and the other end of each lug is slidably mounted on a common rod, all of the lugs having their operating ends centered on a common fixed rod so it is evident that the various slidable rods which are operated do not immediately thereafter transfer their settings to the second selector or permutation bars, but upon a complete revolution of the first selector, the rods which have been moved by the impulses or the failure of impulses, will simultaneously, on account of their lugs being located on a common rod, transfer their settings to the second selectors or permutation bars which will be moved simultaneously. The movement of these second selectors or permutation bars, will allow simultaneous movement of the pin shafts or third selectors 104 and 160, in case both of the pin shafts are moved, but it is evident that certain selections will only move one of the pin shafts 104 or 160 as the case may be.

The permutation bars 87 and 87' in the second selector determines the direction of rotation of the pin shafts 104 and 160 and that doubles the amount of selection possible by each of the pin shafts 104 and 160. When the pin shafts have been moved to the selected position then the striking bails 157 and 157a will be operated as fully disclosed in my co-pending application Serial Number 517,171, and these in turn will move coinciding pins in the two pin shafts to cause the selected work performing instrumentality to be actuated.

In my copending patent applications Serial Numbers 404,331 and 517,171, I have set forth two different types of selectors, in the first named application the selector is an electric mechanism, comprising a plurality of sliding bars adapted to be positioned by electric impulses to cause certain contact points to coincide for transmitting an impulse to a magnet for selectively operating the work performing instrumentality operable thereby. In the last named application a constantly rotating member similar to the one herein shown is provided, the said constantly driven selecting member operating upon other selectors, which in turn operate the third selector, but on the said co-pending application 517,171 the second selectors are operated by spring means and the like, after being unlatched, and it is an object of this invention to provide a set of second selectors which are returned positively by cam action to their original or inoperative position. Also, in the present invention, the third set of selectors, or the rotatable shafts carrying the slidable pins therein, are also positively returned to normal position by cam action.

It is an object of this invention to provide a constantly rotating selecting member having a plurality of selectors which are adapted to be operated by successive impulses to position a set of second selectors, the second selectors being operable to automatically position a set of third selectors for automatically and selectively operating a plurality of work-performing instrumentalities, one at a time.

It is a further object of this invention to provide an impulse actuated selector comprising a constantly driven rotating member adapted to be acted upon during a complete revolution by a series of impulses controlling a specific character or work-performing instrumentality, so that for each revolution of the constantly rotating member a character or work-performing instrumentality is selected and actuated.

It is a further object to provide a selector adapted to be operated by electrical impulses and having a plurality of permutation bars and the like for setting up a combination for the selection of a work-performing instrumentality, having all parts actuated positively.

Some of the objects of the invention having been stated, other objects will appear as the description proceeds when taken in connection with the accompanying drawings, in which:—

Figure 1 is a top plan view of the selector and associated parts;

Figure 2 is a side elevation of the selector and associated parts with certain portions removed;

Figure 3 is a sectional plan view, taken along line 3—3 in Figure 2 with certain parts omitted;

Figure 4 is a sectional plan view, taken along line 4—4 in Figure 2;

Figure 5 is a vertical sectional view, taken along line 5—5 in Figure 2 with certain parts omitted;

Figure 6 is a vertical sectional view, taken along line 6—6 in Figure 2 with certain parts omitted;

Figure 7 is a vertical sectional view, taken along line 7—7 in Figures 5 and 6;

Figure 8 is a vertical sectional view, taken along line 8—8 in Figures 5 and 6;

Figure 9 is a vertical sectional view, taken along line 9—9 in Figures 5 and 6;

Figure 10 is a sectional plan view, taken along line 10—10 in Figure 8;

Figure 11 is an isometric view showing certain parts in section and also showing the means for reversing the direction of the rack disposed on each side of the pinion which operates the pin shaft;

Figure 12 is a vertical sectional view taken along line 12—12 in Figure 3;

Figure 13 is a vertical sectional view taken along line 13—13 in Figure 3;

Figure 14 is a sectional view taken along line 14—14 in Figure 4;

Figure 15 is a sectional view taken along line 15—15 in Figure 4;

Figure 16 is a sectional view taken along line 16—16 in Figure 4;

Figure 17 is a sectional view taken along line 17—17 in Figure 4;

Figure 18 is a sectional view taken along line 18—18 in Figure 4;

Figure 19 is a sectional view taken along line 19—19 in Figure 4;

Figure 20 is an exploded isometric view of the lower portion of the vertical slide 98 and its associated parts;

Figure 21 is an enlarged sectional view taken along line 21—21 in Figure 1.

Referring more specifically to the drawings, the numeral 10 denotes a suitable base member upon which are mounted end plates 11, one of which is shown and described, there being another similar plate disposed on the other side of the machine. Secured to plate 11, as by screw 13, is a block 12, and secured to block 12 as by screw 15, is another block 14. Block 16 is also secured to the side of plate 11 as by screws 17 and to block 16 is secured another block 18 by suitable screws 19. Members 12, 14, 16 and 18 are provided to support the second selector bars to be presently described.

Secured to block 18, as by screws 26, is a bracket 25 which supports an electro-magnet 27 which is adapted to be energized successively from any suitable impulse transmitting apparatus such as the scanning mechanisms shown in my co-pending applications, Serial Numbers 404,331 and 517,171, said impulses being transmitted from the scanning mechanism through wires 28 and 29.

In Figures 1 to 6, the structure of said second copending application is shown in part, such as side plate 11, pin shafts 104 and 160 with slight modifications, and though the other side plate is not shown, it is present for supporting the other ends of the pin shafts 104 and 160.

The entire selector apparatus is driven by a shaft 30, which has one end rotatably mounted in bearing 31, said bearing 31 being secured to frame 11 by any suitable means such as stud bolts 32, and the other end of shaft 30 is rotatably mounted in a suitable bearing in the other side wall member not shown. Fixedly secured on shaft 30 is a suitable pulley 33 which is constantly driven from any suitable source of power not shown. A gear 34 is also fixedly mounted on shaft 30, which gear meshes with another idler gear 35 rotatably mounted on stud 36 fixedly secured in sidewall member 11. Gear 34 rotates in a clockwise direction as seen in Figure 2, which, in turn, rotates gear 35 in a counter-clockwise direction. Gear 35 meshes with another gear 41 which is fixedly secured on shaft 42 and this gear 41 is caused to rotate in a clockwise direction.

Gear 41 meshes with another gear 43 which is secured on shaft 44, and gear 43 also meshes with another gear 45 secured on shaft 46 which also has pinion 46a which meshes with pinion 46b which is similar to clutch disk 52 in my co-pending application Serial Number 517,171 which, in said application serves to return the carriage in the scanning mechanism to starting position. Gear 45 meshes with another gear 47 which is fixedly mounted on rotatable shaft 48, said gear 47 being integral with disk 49 which supports one end of the selector rods in the first selector, which is similar in structure to first selector shown in my co-pending application, Serial Number 517,171. It can be seen, by referring to Figure 2 that since gear 41 rotates in a clockwise direction, gear 43 will be rotated in a counter-clockwise direction. This rotation will cause gear 45 to be rotated in a clockwise direction which, in turn, will rotate gear 47 in a counter-clockwise direction, and therefore, the first selector will be rotated in a counter-clockwise direction as will be noted by the arrows on the drawings.

One end of shaft 48 is rotatably mounted in sidewall member 11, and this shaft extends laterally and has its other end rotatably supported by arm 50, integral with block 14. Another disk 51 is fixed on shaft 48. Slidably mounted in disks 49 and 51 and frictionally held against unaided sliding movement by springs 51b in bores 51a, are selector rods 52, 53, 54, 55, 56, and 57, and each of these rods have fixedly secured thereto selector lugs 58, 59, 60, 61, 62, and 63 respectively.

Another rod 70 has each end fixedly secured in members 49 and 51, and it can be seen by referring to Figures 4 and 14 to 19 inclusive, that one end of each of selector lugs 58 to 63 inclusive, is slidably mounted on fixed rod 70.

Slidable selector rods 52 to 57 are shown in their normal position in Figure 4. In other words, one end of each rod projects out beyond the edge of the disk 51 toward the observer when they are not moved by cam lever 71 controlled by impulses from the scanning mechanism.

A suitable cam 151 is secured to member 10 and is disposed around shaft 48. This cam has a projection 151a which is adapted to be contacted by the ends of the selector rods which have been moved by cam lever 71 to successively restore them to their normal position.

Disks 49 and 51, at the places where they are penetrated by rods 52 to 57 have radial bores 51a therein, in the bottom of which there is a compression spring 51b which presses against the rods and holds them frictionally in whatever position to which they are moved.

The cam lever 71 is pivotally mounted intermediate its ends to block 14 by any suitable means such as bolts 72, and a weak tension spring 73 is connected to the right-hand portion of cam lever 71 as seen in Figure 1, and normally holds it in a position, shown in Figure 1. The tension of spring 73 is not sufficient to move slidable rods 52 to 57, but slides over their ends when not engaged by a hook member 74. Hook 74 is normally held against member 75.

Member 25 has pivotally secured thereto an arm 75 which is normally pressed away from magnet 27 by compression spring 79. Loosely mounted on a pin 76, near the end of arm 75, is dog member 74 having a shoulder near its outer end and this dog member is also penetrated by a suitable pin mounted in arm 75 and around which, a compression spring 77, is mounted, which normally presses the lower end of dog 74 against arm 75. This allows a resilient connection of arm 75 and dog 74. When magnet 27 is not energized by an impulse, the parts will be in a position as shown in Figure 1, that is, tension spring 73 will pull the right-hand end of cam lever 71 back to a point where it will fall behind the hook on the end of dog 74 and the spring 79 will force dog 74 to the position shown in Figure 1. This will latch the cam lever 71 in position and cause the next sliding rod in the first selector, which crosses the left-hand end of cam lever 71, to be moved laterally by the cam lever 71. The impulses for operation of magnet 27 may come from any suitable source such as the scanning mechanism shown in my above referred to co-pending applications, or it could come from a perforated tape or any other suitable impulse transmitting means.

In order to selectively rotate pin shaft 104, permutation bars 87, 88, and 89, forming part of the second selector, are provided, which bars are slidably mounted in blocks 12 and 14 and are operated by the first selector. Permutation bar 87 is provided to operate the rack selecting mechanism. This bar 87 has suitable upwardly projecting members 90 and 91 between which a suitable projection 93 is adapted to operate. Projection 93 is fixedly secured to the lower portion of member 94, said member 94 being mounted for oscillation as at 95. This member 94 projects upwardly and has a fork 94a therein, adapted to engage a pin 96, integral with a laterally sliding member 97.

Since member 94 is pivotally secured to a vertically disposed slide 98, as at 95, it is evident that when a lug on rod 70 pushes permutation bar 87 to the right, as shown in Figure 7, that the lower end of bar 94 will also move to the right which, in turn, will move the upper end of bar 94 to the left. This movement of the upper end of bar 94 to the left, will cause pin 96 and sliding member 97 to move to the left and will thereby move rack 102 upwardly and rotate pin shaft 104 in a clockwise direction.

By referring to Figures 11 and 20, the means for reversing the movement of the racks can be seen more clearly. Member 97 is slidably secured to vertical slide 98 by means of a suitable cuff 99, said cuff being secured to slide 98 by any suitable means such as screws 100. Suitable racks 101 and 102 are provided which operate the pinion 103 which is fixedly secured to the end of pin shaft 104.

In Figure 11, the sliding member 97 is shown as it engages the rack 101, consequently, when slide 98 is forced upwardly by spring 106, the rack 101 will be forced upwardly which will tend to rotate the pin shaft 104 in a counter-clockwise direction.

Let us assume that the selector lug 58 has moved permutation bar 87 and the upper end of member 94 will then force pin 96 and sliding bar 97 to the left. This will cause bar 97 to engage rack 102 and at the same time release rack 101 which will allow pin shaft 104 to be rotated in a clockwise direction. It is evident that the amount of distance that the slide is allowed to move upwardly, and also the position of sliding bar 97, determines the amount and the direction of the rotation of pin shaft 104.

Slide 98 is normally pulled upwardly by means of a spring 106, said spring being secured at its lower end as at 95, and at its upper end to bracket 108, said bracket 108 being secured to transverse bar 109. Bar 109 is secured by any suitable means such as screws 110, to guide members 112 and also to bearing 113.

Bearing 113 is mounted in sidewall member 11, and this bearing holds the racks and also the vertical sliding members in position. Each time the selector barrel makes a revolution, the slide 98 makes one upward sliding movement, the amount of stroke of this movement being determined by permutation bars 88 and 89, one, or both of which, may have been moved by the selector rods in the continuously rotating first selector.

On the upper end of slide 98 is a roller 114 which is eccentrically and fixedly mounted on bolt 115, in order that adjustment between this roller and cam 107, which is fixedly mounted on shaft 42, may be obtained. Each time that the slide moves upwardly, the cam 107 returns it to its lowermost position during the same revolution of the selector barrel.

The sliding bar 97 remains in its laterally moved position and returns the rack it engages to normal position under pressure of cam 107. This normal position is shown in Figure 2. The next selection determines whether 97 remains in engagement with rack 101, or is shifted to engage rack 102.

The normal position of members 98 and 98' is in the position shown in Figures 2 and 7. The members 98 and 98' are allowed to move upwardly under pressure of springs 106 and 106' depending upon which of the permutation bars controlling upward movement, are actuated by the first selector. Also the direction of rotation of the pin shafts 104 and 160 is determined by the permutation bars 87 and 87', as has been fully described. The purpose of cams 107 and 107' is to return the members 98 and 98' to lowermost position to permit reset of the permutation bars by the reset arm 140, and reset the third selectors 104 and 160.

Secured to the lower portion of slide 98 by any suitable means such as screws 121, is another member 120. Member 120 has vertically disposed projections 122 and 123 integral therewith, which project upwardly, and integral with the lower side of permutation bar 88 are projections 124 and 125 which project downwardly and are disposed opposite projections 122 and 123 when permutation bar is in normal position.

It will be seen by referring to Figures 8 and 20, that there is a clearance between projections 122 and 124 and projections 123 and 125. This clearance will allow a slight upward movement of the slide 98 each time the selector barrel makes a revolution, regardless of whether any impulse has actuated any of the slidable racks in the first selector.

Permutation bar 88 is slidably mounted in transverse groove 88a in slide 126 which, in turn, is mounted for vertical sliding movement in block 12. Slide 126 is normally held in elevated position by means of a spring 127 which is secured to the lower side of block 12.

The lower side of slide 126 has a projection 126a which is adapted to engage the lower side of member 120. The side of slide 126, nearest the observer, in Figures 9 and 20, is vertically grooved which forms projections 129 and 130, and these projections extend upwardly to near the lower side of permutation bar 89. When permutation bar 89 is moved to the right in Figure 4, by one of the selector lugs, the projections 129 and 130 are adapted to move upwardly into notches 131 and 132 cut in the lower side of permutation bar 89, when cam 107 allows spring 106 to move bar 98 upwardly.

In the position shown in Figure 9, a small clearance is apparent between the lower side of permutation bar 89 and the upper side of projections 129 and 130. This clearance also allows a slight upward movement of slide 98 each time a revolution is made by the selector barrel. It should be noted that this clearance between the lower side of permutation bar 89 and the upper side of projections 129 and 130, and also the clearance between projections 122 and 123 on member 120, and projections 124 and 125 on bar 88, are necessary to allow the slide 98 to move upwardly upon each revolution of the selector barrel, a sufficient amount to allow the pin shaft to be rotated and to bring the first row of pins either above or below to a horizontal position, depending on which rack, 101 or 102, is engaged by bar 97. These clearances are cumulative, and therefore, the slide 98 will be allowed to move upwardly the combined amount of both clearances, each time the selector barrel makes a revolution. The position shown in Figure 13 is the normal position of the pin shafts to which they are returned by members 98 and 98'.

Whenever permutation bar 88 is moved inwardly by one of the selector lugs, the slide 98 and the lug 120 on the lower end thereof, will be allowed to move upwardly, past the projections 124 and 125, until projections 122 and 123 strike the lower side of permutation bar 88 between projections 124 and 125. In the meantime, the slide 126 will be held in the position shown in Figures 8 and 9. This upward movement will bring the third row of pins in the pin shaft in a horizontal position.

A suitable leaf spring 82 is secured to permutation bar 88 by any suitable means such as screws 83. This spring is adapted to contact slide member 126 and to assist in frictionally holding the permutation bar in whatever position it may be moved.

By referring to Figures 9 and 20 it can be seen that when permutation bar 89 is pushed inwardly by one of the selector lugs that projections 129 and 130 will be allowed to move upwardly into notches 131 and 132 which will allow the slide 126, bar 88, member 120 and slide 98 to move upwardly a like amount. This upward movement will bring the second row of pins in the pin shaft in a horizontal position.

If permutation bars 88 and 89 are pushed inwardly at the same revolution of the first selector, the slide 98 will be allowed to move upwardly the combined amount described in the two preceding paragraphs and this upward movement will bring the fourth row of pins in the pin shaft in a horizontal position. Therefore, four combinations have been described thus far, namely, when the first row of pins in the pin shaft are brought into a horizontal position due to the clearance between the projections 122, 123, 124, and 125 combined with the clearance getween the projections 129 and 130, and the lower side of permutation bar 89. The next combination is set up when permutation bar 88 is pushed inwardly and projections 122 and 123 are moved upwardly. The third combination is set up when permutation bar 89 is pushed inwardly and the projections 129 and 130 are allowed to move upwardly into notches 131 and 132 and the fourth combination is set up when permutation bars 88 and 89 are both pushed inwardly simultaneously, which allows a combined upward movement of slide 98 described in the last two named combinations.

The four combinations above described, are obtained by the rotation of the pin shaft in one direction, and it is evident that four other combinations may be obtained by having bar 87 select the other rack to rotate the pin shaft in another direction, thus giving eight selections for each pin shaft.

The above description applies to the mechanism which operates the front pin shaft 104. The rear pin shaft 160 is operated with an identical structure and similar reference characters will be given with the prime notations added.

The right-hand end of permutation bars 87, 88, and 89, as shown in Figure 4, are adapted to abut the left-hand end of sliding bars 135, 136 and 137 which are slidably mounted in block 18. The right-hand end of bars 135, 136, and 137 are adapted to be contacted by members 139, threadably secured in reset arm 140.

Reset arm 140 projects upwardly and is mounted for oscillation as at 141 and on the upper end of this member, a suitable roller 142 is secured which is adapted to contact cam 143 mounted on shaft 30. Each time shafts 30 and 48 make one revolution the lower end of the member 140 is forced inwardly since cam roller 142 contacts cam 143 at all times. A suitable spring 144, which is secured to the lower edge of member 140 and also to member 11, holds the cam roller 142 against cam 143 at all times. In other words, the members 139 return the permutation bars to normal position each time a revolution of the selector barrel is made, and after a selection has been made, so the selector is reset for receiving another selection from the first selector.

It is to be observed in Figure 2, that the sliding bars 98 and 98' have been returned to normal position, while the high point 143a of cam 143 has also operated lever 140 to move the second selector bars back to normal position ready to receive the setting from the first selector as it is to be observed that rod 70 is almost in position to move past the second selector bars. It is evident that 98 and 98' must be returned to normal position before second selector bars 88, 89, 88', and 89' can be returned to normal position.

In my co-pending application Serial Number 517,171, the normal position of the two pin shafts corresponding to 104 and 160 in the application, is at a position where no pin in the first pin shaft is coinciding with a push bar, and no pin in the second pin shaft is in position to be operated, but in the present application, the pin shafts 104 and 160 are always returned to a position where one pin therein, in both the lower case and higher case sections will be in operative position. This is caused by the clearance between the bars 88, 89, 88', and 89' and the projections 122, 123, 129, and 130, already described, which allows the members 98 and 98' to move upwardly even if none of the second selector bars are moved. Since bars 87 and 87' are always returned to normal position, then slide 97 is always in engagement with rack 101 before this upward movement is allowed in 98 and therefore, the pin shafts 104 and 160 are always moved slightly in a counter clock-wise direction upon upward movement of 98 and 98' due to this clearance to position the first pin in both sections of the pin shafts in an operative position. This means that when no impulses are received by the magnet in one revolution of the first selector that the pin shafts will be in a position to operate the carriage return mechanism, as shown in my co-pending application, Serial Number 517,171, or for other purposes.

For the operation for the rear pin shaft 160, suitable bars 145, 146, and 147 are slidably mounted in member 12 and the right-hand end of these bars, as shown in Figure 4, contact permutation bars 87', 88' and 89', these bars being identical in all respects to permutation bars 87, 88 and 89.

A suitable plate 84 is secured to the upper portion of block 16 by any suitable means such as screws 84a, which serves to hold permutation bars 87 in its lower position and prevent it from rising upwardly. A similar plate 116 is secured to the upper portion of block 12 by any suitable means such as screws 116a, which also serves to prevent upward movement of bars 98, 145, 146, and 147. Another plate 117 is secured to block 18 by any suitable means such as screws 117a which prevents the upward movement of bars 135, 136, 137 and permutation bar 87'; whereas plate 118 is secured to block 16 by any suitable means such as screws 118a and this plate prevents the upward movement of permutation bar 89'. As heretofore stated, there is a possibility of eight combinations being set up by the first three permutation bars, namely, 87, 88, and 89, but when these bars are worked in conjunction with bars 87', 88', and 89' and the mechanism associated therewith, there is possibility of sixty-four combinations being set up for selecting sixty-four work-performing instrumentalities. This number of selections is increased by the split pin arrangement to be hereinafter described.

Pin shaft 104 has slidably mounted therein a plurality of pins which are radially disposed at different angles in the shaft and when they are brought to a horizontal position they are adapted to be pushed inwardly by suitable striking bails 157 or 157a, which are identical to the striking bails 764 and 772 in my co-pending application Serial Number 517,171, which in turn forces sliding bars 152, and the split bar such as 150 and 158, to the right as shown in Figures 3, 12, and 13, to move one of the pins which are slidably mounted in rear pin shaft 160. The sliding bars 152 are more fully shown and described in my co-pending application Serial Number 517,171, as bars 620b to 633b. The right-hand end of the pins in pin shaft 160 move members 669 pivoted at 676, to move one of the members 678 into the path of a striking bail 700 to cause movement of one of the work performing instrumentalities such as 30a. The parts 669, 676, 678, and 700 are fully described in my co-pending application Serial Number 517,171 by identical reference characters, and 30a bears reference character 30 in my co-pending application.

The bars between the front and rear pin shafts are shown in normal position as in Figures 3, 12, and 13, and are held in this position by means of compression springs 163, one end of which is adapted to press against a plate 164 and the other end presses against projections 165 which are integral with the lower side of the sliding bars.

Front pin shaft 104 has a lower housing 167 and an upper housing 166, both of which are semicircular in cross-section and serve to keep the pins in their proper position with the housings. The rear pin shaft 160 has similar housings 168 and 169 which answers the same purpose and holds the pins in their proper position.

Pin shaft 104 is similar to pin shaft 601 in co-pending application Serial Number, 517,171 and has a plurality of pins 200, 201, 202, and 204 and the like, identical to the pins 650 in said co-pending application. The pin shaft 160, similar to pin shaft 601 in said co-pending application, Serial Number 517,171, has a plurality of pins 161 therein, corresponding to pins 650 in said second co-pending application. The entire length of the pin shafts is not shown in the present application, as this is shown in said second co-pending application. The portions of the pin shafts having the split pins therein are shown in this application, as well as adjoining portions.

Dual means are provided in a portion of the second selector which not only operates to control rotation of one of the pin shafts but also to determine what portion of the pin shaft has its pins moved for selection of a character.

In order to obtain additional characters for fractions and the like, it has been necessary to provide additional mechanism in the third selector or pin shaft. The object of this mechanism is to make it possible, when associated with a line-casting machine, to operate the lower case side of the machine from selections made on the higher case side.

Integral with the upper portion of sliding bar 145, (see Figures 2 and 4), is an upstanding projection 170 which has in the upper end thereof, a suitable pin 171. This pin is adapted to operate in a slot 172, in the lower end of vertically disposed member 173, mounted for oscillation as at 174.

The upper portion of member 173 has beveled surface 175 which is adapted to contact roller 176, said roller 176 being disposed on one end of rod 177. Rod 177 is slidably mounted in sidewall member 11 and also in bracket 178, and has fixedly secured thereon levers 179 and 180. Lever 180, (see Figure 12), has a downwardly projecting member 181 integral therewith, to which is attached a suitable tension spring 182 and the other end of this spring is secured, as at 183, to the upper portion of cover plate 184 which is fitted across the sliding bars. Spring 182 normally holds the roller 176 on the end of rod 177, against beveled surface 175 at all times.

Lever 179 has a downwardly projecting arm 186 integral therewith which is similar to downwardly projecting arm 181 and this arm is adapted to be contacted by lug 158a on sliding bar 158 when a suitable combination is set up.

It is evident by referring to Figure 3, that in the position shown, it is impossible to operate the sliding bar 158 without operating the sliding or push bar 150, since lug 158a will push arm 186 to the right in Figure 13, which movement will be transmitted through rod 177 to arm 181, which in turn will be pushed against lug 150a on bar 150.

Let us suppose that selector lug 63 will be pushed away from the observer in Figure 4 and to a position where, as it revolves, it will contact and move sliding bar 145. This will cause the upper portion of bar 173 to be moved to the left which will move rod 177 inwardly or away from the observer in Figure 1. Likewise, the arm 181 will be pushed away from the observer in Figure 3, and approximately half of this projection will be to the right of the lug 149a (Figure 3), whereas, the other half will be to the left of lug 150a, and in the meantime, projection 186 will be pushed out of the path of projection 158a. In this position both bars 149 and 150 will be moved simultaneously by pin 205.

In the position shown in Figure 3 it is seen that when bar 158 is moved it will move bar 150 through the instrumentality of rod 177 to select a character from the lower case side of the pin shafts.

In ordinary newspaper work, the linecasting machine used for setting the market reports is equipped with an additional magazine having a different font of type from that which is used in straight matter, for example, the miscellaneous characters such as "fl", "ff" and "fi", which are on the lower case side and the characters "&", "—", "@" and "lb." which are on the cap side are removed from the magazine and fractions substituted in their particular channel, or other characters may be moved in the same manner and substitutions made. This additional magazine is moved to operative position when setting market reports.

In the operation of this machine as shown in its present form, all of the fractions are operated from the cap side. When figures and fractiors are transmitted over the wire they are received in this form, i. e., 88—6, 88—7, 88—5, etc., which denotes 88 6/8, 88 7/8, 88 5/8 etc. It is evident that the fractions 6/8, 4/8 or 2/8 represent ¾, ½ or ¼ in the magazine. The dash ("—") between the "88" and the "6", for example, when it is scanned, shifts the mechanism to the cap side and is equivalent to the cap shift signal which changes the operation of this automatic typesetting machine, from lower case to cap.

Since three of the fractions are on the lower case side, namely, ⅛ ⅜ and ⅞ operated by pins 190, 191 and 192 respectively, and must be operated from the cap side, the mechanism previously described, is used to accomplish this result. While the channels in the magazine corresponding to split pins 190, 191, and 192 are occupied by fractions, there is no occasion for these particular pins to be operated from the lower case side; however, when these particular channels are occupied by characters "fl", "ff" and "fi" pins 197, 198, and 199 which are in the same vertical plane as pins 190, 191, and 192 are brought into action through the normal workings of the machine and are operated from the lower case side. In other words, pins 190, 191, and 192 are for fractions operation only, in this particular case, and pins 197, 198, and 199 are for use in normal operation of the machine.

By referring to Figure 3 the pins are shown which operate the fractions. Split pins 190, 191, and 192 operate fractions ⅛, ⅜ and ⅞ respectively, and on the lower case side, while pins 193, 194, 195, and 196 operate fractions ⅜, ⅝, ⅝ and ⅞ respectively, and are on the cap side. All fractions set up are operated primarily from sectional pin roll 104 through pin 200 or 201. Pin 200 operates the fraction ⅞ and when this pin 200 is brought in a horizontal line it contacts slide 158a which also pushes lever 186 to the right, slide 158 carrying lug 158a, (see Figure 3). This movement is transferred through shaft 177 to lever 181, the lower portion of said lever engaging lug 150a which operates slide 150 to push split pin 192 in the same direction. It should be noted that slide 158 also pushes bar 189 to the right at this time but since neither of pins 193 to 196 inclusive, are brought into line, no selection is made from this point.

When pin 201 is brought to a horizontal position and the pin shaft 160 is rotated in a counterclockwise direction, the split pins 190 and 191 may be brought into line, and operated in the same manner as split pin 192, which has been previously described.

For operation of fractions ⅜, ⅝ and ⅝, pin 201 is brought to a horizontal position as individual selecting pin roll 160 is rotated in a clockwise direction, bringing into line one of pins 193 to 196 inclusive. The operation which causes pin roll 160 to operate in a clockwise direction also causes shaft 177 and lever 186 to move away from the observer, (see Figure 3), so that lug 158a will not contact lever 186; therefore, either one of pins 193 to 196 inclusive may be operated from pin 201 which engages slide 158, which slide also engages bar 189 to operate the pins.

The provision of the split pin arrangement in pin shaft 160 and the means associated with rod 177 for operating the same, really amounts to a fourth selector, for it increases the number of work performing instrumentalities which can be selected from a given number of pins in each pin shaft. Although I have shown only one rod 177, operated from one of the second selector bars, it is evident that each of the other selector bars in the second selector, could be likewise associated with a similar mechanism, which would likewise increase the number of selections possible from pin shafts having a given number of pins therein.

It is to be noted that in the second co-pending application, the pins are arranged so that their protruding ends form a spiral arrangement around the two pin shafts and this structure is present in the present application, though not shown fully, therefore conventional pin 205, for example, operates in the usual manner to operate one of the pins 161, but were it not for the arrangement of the split push bars 149 and 150, when the shaft 160 was moved to a point where ordinarily the pins 161 would not be engaged by push bar 150, but by the fourth selector arrangement one of the split pins 190, 191, 197, 198, or 199 will be operated. Each of these split pairs have one of their counterparts arranged in the conventional position, whereas the other counterpart is arranged in another angular position to be operated by the fourth selector arrangement.

When the higher case striking ball 157a is operating it is evident that the pins 191, 192, and 193 in Figure 3, even though they are alined with the push bar 150, will not be moved, but by the split pin, or fourth selector arrangement, these pins are moved through rod 177 being moved by the push bar 158 which is operated while it is out of alinement with any of its associated pins 193 to 196, but moves the pins in the lower case side of the pin shafts.

In market reports the numerals such as "2", "3", will be on the lower case side of the selectors 104 and 160, or the upper portion of Figure 1. The fractions such as "2/8", "3/8" will be on the higher case side, or nearest the observer in Figure 1. The quotation "6¾" would be transmitted as to "6's", spaced from each other with some notation, such as the higher case shift code therebetween. The first "6" would be selected by the lower case side of the pin shafts, but the higher case code before the next "6" would shift the mechanism to the higher case side and move the higher case striking bail and the second "6" would be as "¾" for reproduction by the typesetting machine, typewriter and the like. The pins for "6" and "6/8" or "¾" are located in the same horizontal plane in the pin shaft 160.

Pin 205 in the lower half of Figure 3, is a conventional pin and when it coincides with conventional push bar 149, one of the pins 161 is normally operated as one of these pins 161 is alined with push bar 149 and pin 205. This is a normal operation of the machine. When pin 202 is alined with the portion 189 of a conventional push bar, it always has one of the pins 193 to 196 alined therewith, and this is normal operation, but when one of the pins 200 or 201 is alined with bar 158 then none of the pins 193 to 196 is alined with bar 189 but the lug 158a moves lever 186 which in turn moves lever 181 against lug 150a and operates the usual split portion of pins 197, 198, and 199 or the conventional pins 161, one of which will be in alinement with the split push bar 150. This operation can take place without any shift of rod 177. Also it is seen that when a pin in pin shaft 104 moves push bar 150 this will operate the portion of the split pin bars coinciding therewith which are in normal position in pin shaft 160 and operate in the usual manner. Now when the rod 177 is moved laterally to cause interlocking of lugs 149a and 150a, then it is seen that operation of split push bars 149 and 150 will take place but these will not coincide with the pins 161 but push bar 150 will coincide with some of the unusual counterparts of the split pin opposite thereof and will operate these split pins for selecting a character on the lower case side from operation of the higher case striking bail through means of push bars 158 and rod 177. Also with the parts in the position shown in Figure 3, it is evident that when the higher case shift is operated to move pin 200 or pin 201 the bar 158 will be moved as well as bar 189 but these will be out of alinement with any of the pins 193 to 196 but the rod 177 will be moved which will move one of the split pins opposite push bar 150 when the parts are in the position as shown in Figure 3.

It is therefore evident that a plurality of selections can be made by employing a portion of the other section of the pin bars when one of the sections is being operated by its striking bail.

The selections made through the operation of pins 200 and 201 and the push bars 149 and 150 are transferred over to the lower case side of the pin shafts without the shifting of the rod 177, and with the use of rod 177 it is seen that operation of push bars 149 and 150 is effected one at a time or together, depending on whether or not the rod 177 is shifted.

In the drawings and specification there has been set forth a preferred embodiment of my invention and although specific terms are employed, they are used in a generic and descriptive sense only, and not for purposes of limitation, the scope of the invention being set forth in the appended claims.

I claim:

1. A selecting mechanism controlled by a plurality of electrical impulses for selectively operating a plurality of work-performing means comprising a first selector, a second selector controlled by the first selector, a third selector controlled by the second selector, and a fourth selector controlled by the second selector for selecting the portions of the third selector to be operated.

2. A selecting mechanism controlled by a plurality of electrical impulses for selectively operating a plurality of work-performing means one at a time, comprising a first selector, a second selector controlled by the first selector, a third selector having two sections operable, one at a time, means controlled by the second selector for controlling the third selector, and a fourth selector controlled by the second selector for selecting the section of the third selector to be operated.

3. A selecting mechanism controlled by a plurality of successive electrical impulses for selective operation one at a time, of a plurality of work-performing means, comprising first, second and third selectors controlling each other in sequence and a fourth selector controlled by the first and second selectors and having independent connections with the third selector for controlling the same.

4. A selecting mechanism controlled by a plurality of successive electrical impulses for selective operation, one at a time, of a plurality of work-performing means comprising a first selector having a plurality of independently operable elements and controlled by electrical impulses, a second selector having a plurality of other independently operable elements movable by the elements of the first selector, a third selector having a plurality of independently operable elements controlled by the first and second selectors, the elements in the first and second selectors having no normal position to which they tend to return.

5. A selecting mechanism controlled by a plurality of successive electrical impulses for selective operation, one at a time, of a plurality of work-performing means comprising a constantly driven first selector having a plurality of parts adapted to be successively and selectively positioned by a plurality of electrical impulses, a second selector having a plurality of parts adapted to be simultaneously and positively operated by the first selector, means for positively and successively returning the parts in the first selector to normal position, a third selector controlled by the setting of the second selector, means for positively returning the second selector to normal position after its setting has been transferred to the third selector, and separately driven means for returning the third selector to normal position before the second selector is returned to normal position.

6. A selecting mechanism controlled by a plurality of impulses for selective operation, one at a time, of a plurality of work-performing means comprising a first selector having a plurality of independently movable means, a second selector having a plurality of independent means movable by the movable means in the first selector, a third selector controlled in its movement to selected position by the second selector, and means in the third selector for operating, one at a time, the work-performing means.

7. A selecting mechanism controlled by a plurality of successive electrical impulses for selective operation, one at a time, of a plurality of work-performing means comprising a first selector having a plurality of parts adapted to be selectively positioned by a plurality of impulses, a second selector having a plurality of elements adapted to be simultaneously moved by the selectively positioned parts of the first selector, a third selector, means connected to the second and third selectors for positioning the third selector in accordance with the setting of the second selector, means for successively returning the selectively positioned parts in the first selector to normal position, other means for simultaneously restoring the selectively positioned elements of the second selector to normal position, and still other means for restoring the connections between the second and third selectors to normal position.

8. A selecting mechanism controlled by a plurality of impulses for selective operation, one at a time, of a plurality of work-performing means comprising a first selector, a second selector controlled by the first selector, a third selector for operation of the work-performing means and controlled by the first and second selectors, the third selector being divided into two sections operable, one section at a time, and means controlled by the second selector for operating one section of the third selector from the other section of the third selector.

9. A selecting mechanism controlled by a plurality of successive electrical impulses for selective operation, one at a time, of a plurality of work-performing means comprising a first selector having a plurality of parts adapted to be selectively positioned by a plurality of impulses, a second selector having a plurality of elements adapted to be simultaneously moved by the positioned parts of the first selector, a third selector, means connected to the second and third selectors for positioning the third selector in accordance with the setting of the second selector, means for returning the said connections between the second and third selectors to normal position after the selection of a work-performing means, and other means operable after the said connections have been returned to normal position for returning the elements of the second selector to normal position.

10. A selecting mechanism for selecting characters for reproduction, as in typewriting, typesetting and the like comprising a first selector, a second selector controlled by the first selector, a third selector controlled by the second selector, the third selector being divided into a higher case section and a lower case section and means for operating one section at a time and means for operating a portion of one section of the third selector to actuate a character in another portion of the same section of the selector.

11. A selecting mechanism controlled by a plurality of successive electrical impulses for selecting characters for reproduction, one at a time, as in typewriting, typesetting and the like, comprising a first selector having a plurality of parts operable by electrical impulses, a second selector having a plurality of elements operable simultaneously by the operated parts in the first selector, a third selector having a high case section and a lower case section, connections between the second and third selectors for positioning the third selector, means for operating the sections of the third selector, one at a time, and means controlled by the second selector for actuation of a character in one section of the third selector to actuate a different character in the other section of the third selector.

12. A selecting mechanism for selecting characters for reproduction as in typewriting, typesetting and the like, comprising a first selector, a second selector operated by the first selector, a third selector operated by the second selector, the third selector being divided into a higher case section and a lower case section, means for operating one section at a time, and means for operating a portion of one section of the third selector to actuate a character in the other section of the third selector.

13. A selecting mechanism controlled by a plurality of electrical impulses for selecting one of a plurality of work-performing instrumentalities comprising a first selector having a plurality of selector rods, a second selector having a plurality of selector bars actuated by the first selector, a third selector actuated by the second selector, and the three selectors having no normal position to which they tend to return.

14. A selecting mechanism controlled by a plurality of electrical impulses for selecting one of a plurality of work-performing instrumentalities comprising a first selector, having a plurality of selector rods, a second selector having a plurality of selector bars actuated by the first selector, a third selector actuated by the second selector, and cam means for each selector for returning the three selectors to normal position.

15. A selecting mechanism controlled by a plurality of electrical impulses for selecting one of a plurality of work-performing instrumentalities comprising a first selector having a plurality of selector rods, a second selector having a plurality of selector bars and actuated by the first selector, a third selector actuated by the second selector, a cam means for returning the second selector to normal position after it has been operated by the first selector to position the third selector, and other cam means for returning the third selector to normal position.

16. A selecting mechanism controlled by a plurality of electrical impulses for selecting one of a plurality of work-performing instrumentalities comprising a first selector having a plurality of selector rods, a second selector having a plurality of selector bars actuated by the first selector, a third selector actuated by the second selector, cam means for returning the third selector to normal position after it has been operated by the second selector, cam means for returning the second selector to normal position after the third selector has been returned to normal position, the second selector bars having no normal position to which they tend to return.

17. A selecting mechanism controlled by a plurality of electrical impulses for selecting one of a plurality of work-performing instrumentalities comprising a first selector, having a plurality of selector rods, a second selector having a plurality of selector bars actuated by the first selector, a third selector actuated by the second selector, cam means for returning the second selector to normal position after it has been operated by the first selector to position the third selector, cam means for returning the third selector to normal position before the second selector is returned to normal position, the three selectors having no normal position to which they tend to return.

18. A selecting mechanism controlled by a plurality of electrical impulses for selecting one of a plurality of work-performing instrumentalities comprising a first selector having a plurality of selector rods, a second selector having a plurality of selector bars actuated by the first selector, a third selector actuated by the second selector, the second selector bars having no normal position to which they tend to move.

19. A selecting mechanism controlled by a plurality of electrical impulses for selecting one of a plurality of work-performing instrumentalities comprising a first selector having a plurality of selector rods, a second selector having a plurality of selector bars actuated by the first selector, a third selector actuated by the second selector and means for returning the second selector to normal position after it has been operated by the first selector to position the third selector, connections between the second and third selectors, and cam means for returning these connections to normal position before the second selector bars are returned to normal position.

20. A selecting mechanism controlled by a plurality of electrical impulses for selecting one of a plurality of work-performing instrumentalities comprising a first selector having a plurality of selector rods, a second selector having a plurality of selector bars actuated by the first selector, a third selector actuated by the second selector and cam means for returning the second selector to normal position after it has been operated by the first selector to position the third selector, the second selector bars having no normal position to which they tend to move.

21. A selecting mechanism controlled by a plurality of electrical impulses and comprising a plurality of groups of selectors interdependently related and having no normal position to which they tend to return.

22. A selecting mechanism controlled by a plurality of electrical impulses and comprising a plurality of groups of selectors having no normal position to which they tend to return.

23. A selecting mechanism controlled by a plurality of electrical impulses and comprising a plurality of groups of selectors having no normal position to which they tend to return and cam means for returning the selectors to normal position.

24. A selecting mechanism having a plurality of selectors, one acting upon the other, electric impulse means for actuating the first of the selectors, the selectors having no normal position to which they tend to return.

25. A selecting mechanism having a plurality of selectors, one acting upon the other, electric impulse means for actuating the first selector, the selectors having no normal position to which they tend to return and cam means for returning all of the selectors to normal position.

26. Selecting mechanism comprising a pair of alined movable members having a plurality of transversely movable members therein, means for selectingly moving said members to aline a transversely movable member in each movable member, the movable members being divided into two sections, separated means operable one at a time for actuating the transversely movable members in one section, and means operable by a transversely movable member in one section for actuating a transversely movable member in the other section.

27. Means for selectively actuating a plurality of work performing instrumentalities comprising an electric impulse actuated mechanism, a plurality of slidable notched members selectively movable by the electric impulse mechanism, a plurality of other notched bars movable transversely of the first notched bars and controlled in their movements by the first bars, and means controlled by the combined movement of said bars for selecting for actuation one of the work performing instrumentalities.

28. A selecting mechanism for a plurality of work performing instrumentalities comprising a rotating member having a plurality of slidable members therein, electric impulse controlled means for selectively moving said slidable members, a plurality of permutation bars movable by the moved slidable members, a plurality of other permutation bars controlled in their movements by the first permutation bars and means controlled by said other permutation bars for selectively controlling the work performing instrumentalities.

29. A selecting mechanism controlled by a plurality of electrical impulses for selectively operating a plurality of work-performing instrumentalities one at a time comprising a plurality of selectors, one of the selectors having two sections operable one at a time and means controlled by one of the selectors for actuating one of said sections from a selection in the other section.

30. In a selecting mechanism for selecting work performing instrumentalities comprising a selector having two sections one of which is inoperative while the other is operated, electric impulse means for controlling the selectors and means controlled by the electric impulse means for operating a portion of the inoperative section from the operated section.

31. In a selecting mechanism for selective operation of a plurality of work performing instrumentalities, comprising a pair of spaced oscillating shafts, each of said shafts having a plurality of radially disposed pins slidably penetrating the same, slidable members disposed between the shafts, a striking bail for engaging a pin in one portion of one shaft to move the slidable member and a coinciding pin in the other shaft, a second striking bail for engaging the pins in the other portion of said one shaft to similarly operate a slidable member and pin in the other portions of said other shaft, electric impulse means for controlling the oscillation of said shafts, and means controlled by said electric impulse means for transferring the selection in one portion of said shafts to the other portion of said shafts.

32. A selecting mechanism for selecting work-performing instrumentalities for operation comprising a first selector, electrical impulse means for operating the first selector, a second selector movable by the selections made in the first selector, a pair of third selectors movable in two directions by the second selector and means controlled by the first selector for determining the direction of movement of the third selectors.

33. In a selecting mechanism for selecting characters in reproduction machines such as line casting machines and the like, a pair of oscillatable shafts having a plurality of radially disposed pins slidably penetrating the same, said shafts being divided into upper case sections and lower case sections, electric impulse operated means for selectively oscillating said shafts to cause a pin in one shaft to coincide with a pin in another shaft, a striking bail for striking one pin to move the other pin to actuate a type character and the like, and means controlled by the electrical impulse means for causing a pin on one section of the shafts to move a pin in the other sections of the other of said shafts.

34. A selecting mechanism comprising a plurality of slidable permutation bars, a plurality of other permutation bars movable transversely of the first bars, means for selectively moving the first bars, and means for moving the second bars in accordance with the setting of the first bars and other selecting means movable by the said second bars.

35. In a selecting mechanism for selective operation of a plurality of work-performing instrumentalities, a pair of spaced oscillatable shafts, electric impulse means for selectively oscillating said shafts, each of said shafts having a plurality of radially disposed pins slidably mounted therein, a striking ball for moving the pin in one shaft which is selectively disposed in its path, a push bar for each pin disposed between the shafts and adapted to be moved by a moved pin in the first shaft, said second shaft having at least a portion thereof provided with a pair of pins in the same vertical plane and disposed angularly with relation to each other whereby a work performing instrumentality can be operated from two different positions of the second shaft.

36. A selecting mechanism controlled by a plurality of electrical impulses for selectively operating a plurality of work performing means comprising a first selector having a plurality of slidable rods, means controlled by the electrical impulses for selectively moving the slidable rods, a second selector comprising a plurality of slidable permutation bars and adapted to be moved by the slidable rods which are moved as a result of certain electrical impulses, a third selector comprising a pair of rotatable shafts and controlled by the second selector, the pair of shafts having transversely disposed pins therein for operation of the work performing instrumentalities, means for moving the pins while the rotatable shafts are at rest, a portion of said shaft comprising a fourth selector and means controlled by the second selector for selecting the portions of the third selector to be operated.

37. A selecting mechanism controlled by a plurality of electrical impulses for selectively operating a plurality of work performing means, one at a time, comprising a first selector, means controlled by the electrical impulses for selectively moving portions of the first selector, a second selector comprising a plurality of slidable permutation bars movable by the first selector, a third selector controlled by the second selector and comprising a pair of oscillatable shafts divided into two sections and having transversely disposed slidable pins therein, means for moving the pins to engage the work performing instrumentalities and means controlled by the second selector for controlling the third selector and means also controlled by the second selector for selecting a portion of said rotatable shafts for actuation.

38. A selecting mechanism controlled by a plurality of successive electrical impulses for selective operation, one at a time, of a plurality of work performing means comprising first, second and third selectors controlling each other in sequence and a fourth selector controlled by the first and second selectors and having independent connections with the third selector for controlling the same, the first selector comprising a plurality of movable rods and the second selector comprising a plurality of permutation bars.

39. A selecting mechanism controlled by a plurality of successive electrical impulses for selective operation, one at a time, of a plurality of work performing means and comprising a first selector having a plurality of rods slidable by the electrical impulses, a second selector comprising a plurality of permutation bars movable by the first selector, a third selector comprising a pair of oscillatable pin shafts having transversely disposed pins therein, means for engaging one of the pins to move the other pin in its associated shaft to control the work performing means, means for controlling the third selector from the first and second selectors, the elements of the first and second selectors having no normal position to which they tend to return, and means operable after a selection has been set up in said selectors for returning the first and second selectors to normal position.

40. A selecting mechanism controlled by a plurality of successive electrical impulses for selective operation, one at a time, of a plurality of work performing means comprising a constantly driven first selector having a plurality of slidable rods therein adapted to be successively and selectively positioned by said plurality of electrical impulses, a second selector comprising a plurality of slidable permutation bars adapted to be simultaneously and positively operated by the first selector, means for positively and successively returning the parts in the first selector to normal position, a third selector comprising a pair of rotatable pin shafts controlled by the setting of the second selector, means for positively returning the parts of the second selector to normal position after its setting has been transferred to the third selector and separately driven means for returning the third selector to normal position before the second selector is returned to normal position.

41. A selecting mechanism controlled by a plurality of impulses for selective operation, one at a time, of a plurality of work performing means, comprising a first selector having a plurality of independently movable means, means controlled by the impulses for selectively moving said independently movable means, the second selector comprising a plurality of independently movable permutation bars movable by the movable means in the first selector, a third selector, means controlled by the second selector for moving the third selectors to selected position, and means in the third selector for operating, one at a time, the work performing means.

42. A selecting mechanism controlled by a plurality of successive electrical impulses for selective operation, one at a time, of a plurality of work performing means, comprising a first selector having a plurality of slidable rods adapted to be selectively positioned by said plurality of impulses, a second selector having a plurality of slidable permutation bars adapted to be simultaneously moved by the selectively positioned rods in the first selector, a third selector, means connected to the second and third selectors for positioning the third selector in accordance with the setting of the second selector, means for successively returning the selected positioned parts in the first selector to normal position, other means for simultaneously restoring the selectively positioned bars of the second selector to normal position, and still other means for restoring the connections between the second and third selectors to normal position.

43. A selecting mechanism controlled by a plurality of impulses for selective operation, one at a time, of a plurality of work performing means and comprising a first selector having a plurality of slidable rods therein adapted to be actuated by said impulses, a second selector controlled by the first selector and having a plurality of slidable permutation bars therein, a third selector for operation of the work performing means and controlled by the first and second selectors, the third selector comprising two oscillatable shafts having a plurality of transversely disposed slidable pins therein, means for actuating the pins in one section at a time, means controlled by the pins when actuated for controlling the work performing instrumentalities, and means controlled by the second selector for operating one section of the third selector from the other section of said third selector.

44. A selecting mechanism controlled by a plurality of successive electrical impulses for selective operation, one at a time, of a plurality of work performing means and comprising a first selector having a plurality of slidable rods adapted to be selectively positioned by said electrical impulses, a second selector having a plurality of slidable permutation bars adapted to be simultaneously moved by the positioned rods in the first selector, a third selector, means connected to the second and third selectors for positioning the third selector in accordance with the setting of the second selector, means for returning the said connections between the second and third selectors to normal position after the selection of a work performing means, and other means operable after the said connections have been returned to normal position for returning the elements of the second selector to normal position.

45. A selecting mechanism for selecting characters for reproduction, as in typewriting, typesetting and the like, comprising a first selector having a plurality of slidable rods, electrical impulse means for selectively positioning said slidable rods, a second selector controlled by the first selector and having a plurality of slidable permutation bars, a third selector controlled by the second selector, a third selector being divided into high case section and a lower case section and means for operating one section at a time, and means for operating a portion of one section of the third selector to actuate a character in another portion of the same section of the third selector.

46. A selecting mechanism for selecting characters for reproduction, as in typewriting, typesetting and the like, comprising a first selector, a second selector controlled by the first selector, a third selector controlled by the second selector, the third selector having high case selecting means and lower case selecting means, means controlled by the second selector for selecting the section in the third selector to be operated.

47. A selecting mechanism for selecting characters for reproduction as in typewriting, typesetting and the like, and comprising first, second and third selectors, the third selector having higher case and lower case selecting means, means controlled by one of the selectors for controlling which section of the third selector to be actuated.

48. In a selecting mechanism for selecting characters for reproduction as in typewriting, typesetting and the like, comprising first, second and third selectors, the third selector having lower case and high case sections, means controlled by the second selector for selectively actuating the first or second sections of the third selector.

49. A selecting mechanism for selecting characters for reproduction as in typewriting, typesetting and the like, and comprising first, second and third selectors, the third selector having higher case and lower case sections, and means controlled by the second selector for selectively actuating the two sections.

50. In a selecting mechanism for selecting characters for reproduction as in typewriting, typesetting and the like, and comprising first, second and third selectors, the third selector having higher case and lower case sections, and means controlled by the second selector for actuating one section of the third selector to select a character through the other section of the third selector.

51. A selecting mechanism for selecting characters for reproduction as in typewriting, typesetting and the like, comprising a first selector having a plurality of slidable members therein, a second selector having a plurality of slidable permutation bars operated by the first selector, a third selector operated by the second selector, the third selector having an upper case portion and a lower case portion, means for operating one portion at a time of the third selector and means for operating a portion of one section of the third selector to actuate a character from the other section of the third selector.

52. A selecting mechanism controlled by a plurality of electrical impulses for selecting one of a plurality of work performing instrumentalities and comprising a first selector having a plurality of selector rods, means for imparting rotation to said rods, means controlled by the electrical impulses for selectively sliding said rods, a second selector having a plurality of selector bars actuated by the first selector, a third selector actuated by the second selector and the three selectors having no normal position to which they tend to return.

53. A selecting mechanism controlled by a plurality of electrical impulses for selecting one of a plurality of work performing instrumentalities and comprising a first selector having a plurality of slidable selector rods, means for imparting rotation to said rods in a body, means for selectively actuating said rods, a second selector having a plurality of slidable permutation bars actuated by the selectively operated rods in the first selector, a third selector actuated by the second selector and the three selectors having no normal position to which they tend to return.

54. A selecting mechanism controlled by a plurality of electrical impulses for selecting one of a plurality of work performing instrumentalities and comprising a first selector having a plurality of slidable selector rods, means for imparting rotation to all of said rods, selectively operated means controlled by said electrical impulses for selectively sliding said rods as they rotate, a second selector having a plurality of permutated selector bars actuated by the first selector bar rods which have been moved by the electrical impulse controlled means and a third selector actuated by the second selector and cam means for returning the first two selectors to normal position.

55. A selecting mechanism controlled by a plurality of electrical impulses for selecting one of a plurality of work performing instrumentalities and comprising a first selector having a plurality of slidably mounted selector rods therein, means for rotating the first selector, means actuated by the electrical impulses for selectively sliding said selector rods, a second selector having a plurality of selector bars and adapted to be selectively actuated by the actuated first selector rods, a third selector actuated by the second selector, cam means for returning the second selector to normal position after it has been operated by the first selector to position the third selector and other cam means for returning the third selector to normal position.

56. A selecting mechanism controlled by a plurality of electrical impulses for selecting one of a plurality of work forming instrumentalities at a time and comprising a first selector having a plurality of slidable selector rods, means controlled by the electrical impulses for selectively sliding said rods, a second selector having a plurality of selector bars actuated by the first selector, a third selector actuated by the second selector, cam means for returning the third selector to normal position after it has been operated by the second selector, other cam means for returning the second selector to normal position after the third selector has been returned to normal position, the second selector bars having no normal position to which they tend to return.

57. A selecting mechanism controlled by a plurality of electrical impulses for selecting one of a plurality of work performing instrumentalities at a time and comprising a first selector having a plurality of slidable selector rods, means for mounting said selector rods for rotation as a unit, means controlled by the electrical impulses for selectively sliding said rods as they rotate, a second selector having a plurality of selector bars actuated by the first selector, a third selector actuated by the second selector, cam means for returning the second selector to normal position after it has been operated by the first selector to position the third selector, other cam means for returning the third selector to normal position before the second selector is returned to normal position, the three selectors having no normal position to which they tend to return.

58. A selecting mechanism controlled by a plurality of electrical impulses for selecting one of a plurality of work performing instrumentalities at a time and comprising a first selector having a plurality of slidably mounted selector rods, means for rotating said selector rods as a unit, means controlled by the electrical impulses for selectively sliding said rods, a second selector having a plurality of selector bars adapted to be actuated by the first selector rods which have been moved by the electrical impulse means, a third selector adapted to be actuated by the second selector, the second selector bars having no normal position to which they tend to move.

59. A selecting mechanism controlled by a plurality of electrical impulses for selecting one of a plurality of work performing instrumentalities at a time, and comprising a first selector having a plurality of slidable selector rods, means for mounting all of said selector rods for rotation as a unit, means controlled by the electrical impulses for selectively sliding the said rods, a second selector having a plurality of selector bars adapted to be actuated by the moved first selector rods, a third selector actuated by the second selector, means for returning the second selector to normal position after it has been operated by the first selector to position the third selector, connections between the second and third selectors and cam means for returning these connections to normal position before the second selector bars are returned to normal position.

60. A selecting mechanism adapted to be controlled by a plurality of electrical impulses for selecting one of a plurality of work performing instrumentalities and comprising a first selector having a plurality of slidably mounted selector rods, means for rotating all of said selector rods as a unit, means controlled by the electrical impulses for selectively moving said rods as they rotate, a second selector having a plurality of selector bars adapted to be actuated by the first selector, a third selector adapted to be actuated by the second selector, cam means for returning the second selector to normal position after it has been operated by the first selector to position the third selector, the second selector bars having no normal position to which they tend to move.

61. A selecting mechanism having a plurality of selectors, electric impulse means for actuating the first of said selectors, the first selector operating the second selector and the second selector in turn actuating the third selector, the third selector having two sections operable one at a time, for controlling a plurality of work performing instrumentalities and means controlled by one of the selectors for actuating one of said sections from a selection in the other of said sections.

62. A selecting mechanism controlled by a plurality of electrical impulses and comprising a plurality of groups of selectors arranged in series and one group of selectors controlling the next group throughout the series, all of said groups of selectors having no normal position to which they tend to return.

63. A selecting mechanism controlled by a plurality of electrical impulses and comprising a plurality of groups of selectors one group acting upon the next succeeding selector and each group of selectors having no normal position to which it tends to return.

64. A selecting mechanism controlled by a plurality of electrical impulses and comprising a plurality of groups of selectors, each group having no normal position to which it tends to return and one group controlling the next succeeding group of selectors in sequence and cam means for returning the groups of selectors to normal position.

65. A selecting mechanism controlled by a plurality of successive electrical impulses and comprising a plurality of groups of selectors interdependently related and each group having no normal position to which it tends to return.

66. A selecting mechanism controlled by a plurality of successive electrical impulses and comprising a plurality of groups of mechanical selectors arranged in series, one group acting upon the following group and each group having no normal position to which it tends to return.

67. A selecting mechanism controlled by a plurality of successive electrical impulses and comprising a plurality of groups of selectors and each group having no normal position to which it tends to return and one group controlling the succeeding group throughout the various groups of selectors and cam means for returning each of the groups of selectors to normal position.

68. A selecting mechanism having a plurality of groups of selectors, one group acting upon the other, electric impulse means for actuating the first group, the groups of selectors having no normal position to which they tend to return and positively acting means normally exerting no pressure on the selectors for engaging and returning all of the selectors to normal position.

69. A selecting mechanism having a plurality of groups of selectors, one acting upon the following groups, electric impulse means for actuating the first selector, the selectors having no normal position to which they tend to return and means normally inactive but rendered active after a selection has been made for positively returning all of the selectors to normal position.

70. A selecting mechanism controlled by a plurality of electrical impulses for selectively operating a plurality of work performing means comprising a first selector having a plurality of slidable rods, means controlled by the electrical impulses for selectively moving the slidable rods, a second selector comprising a plurality of slidable permutation bars and adapted to be moved by the slidable rods which are moved as a result of certain electrical impulses, a third selector comprising a pair of rotatable shafts and controlled by the second selector, the pair of shafts having transversely disposed pins therein for operation of the work performing instrumentalities, means for moving the pins while the rotatable shafts are at rest.

71. A selecting mechanism controlled by a plurality of electrical impulses for selectively operating a plurality of work performing means, one at a time, comprising a first selector, means controlled by the electrical impulses for selectively moving portions of the first selector, a second selector comprising a plurality of slidable permutation bars movable by the first selector, a third selector controlled by the second selector and comprising a pair of oscillatable shafts divided into two sections and having transversely disposed slidable pins therein, and means for moving the pins to engage the work performing instrumentalities.

72. A selecting mechanism for operating a plurality of work performing instrumentalities comprising a first selector electrically controlled and a plurality of mechanical selectors mechanically controlled by the first selector.

73. In a selecting mechanism, a first selector, electrical impulse means for selectively positioning the parts of the first selector, a second selector having a plurality of notched permutation bars operable by the first selector, a single notched permutation bar having spring means for moving the same at right angles to the plurality of permutation bars, a pinion slidably mounted on the single permutation bar, a slidable rack disposed on each side of said pinion, a slidable bar controlled by the first selector for moving said pinion into engagement with one of said racks and a third selector controlled by said racks.

74. A selector mechanism having a plurality of selectors, one controlling the next succeeding selector, one of said selectors comprising a plurality of notched permutation bars controlled by the preceding selector, a single notched permutation bar movable transversely of the said notched bars and controlled by said notched bars, and means controlled by the said single bar for making a selection.

75. A selector mechanism comprising a train of selectors, one of said selectors comprising twin selectors controlled by a preceding selector and jointly exercising control over a subsequent selector.

76. A selector mechanism comprising a single selector, a twin selector controlled by the single selector and a third selector controlled conjointly by the twin selector.

77. A selector mechanism comprising a single selector, a twin selector controlled by the single selector and a third selector having two cooperating parts and each part being controlled by one of said twin selectors.

78. A selecting mechanism comprising a plurality of selectors, one of which is a twin selector which jointly exercises control over a subsequent selector.

BUFORD L. GREEN.